(12) United States Patent
Hashimoto (10) Patent No.: US 8,982,239 B2
(45) Date of Patent: Mar. 17, 2015

(54) IMAGING APPARATUS AND IMAGING METHOD FOR RECORDING SHOOTING COMPLETION INFORMATION

(75) Inventor: Tetsuya Hashimoto, Inzai (JP)

(73) Assignee: Ricoh Company, Ltd., Tokyo (JP)

( * ) Notice: Subject to any disclaimer, the term of this patent is extended or adjusted under 35 U.S.C. 154(b) by 28 days.

(21) Appl. No.: 13/808,017

(22) PCT Filed: Jul. 28, 2011

(86) PCT No.: PCT/JP2011/067818
§ 371 (c)(1),
(2), (4) Date: Jan. 2, 2013

(87) PCT Pub. No.: WO2012/018061
PCT Pub. Date: Feb. 9, 2012

(65) Prior Publication Data
US 2013/0107078 A1    May 2, 2013

(30) Foreign Application Priority Data

Aug. 3, 2010 (JP) ................................ 2010-174416

(51) Int. Cl.
*H04N 5/76* (2006.01)
*H04N 5/232* (2006.01)
(Continued)

(52) U.S. Cl.
CPC ....... *H04N 5/23293* (2013.01); *H04N 1/32101* (2013.01); *H04N 5/772* (2013.01);
(Continued)

(58) Field of Classification Search
CPC ................................................ H04N 2101/00
USPC .................... 348/231.3, 333.01; 707/104, 803
See application file for complete search history.

(56) References Cited

U.S. PATENT DOCUMENTS 5,805,215 A    9/1998    Mizoguchi 6,657,666 B1    12/2003    Imagawa et al.
(Continued)

FOREIGN PATENT DOCUMENTS

EP    0 678 816 A2    10/1995
EP    1 133 151 A2    9/2001
(Continued)

OTHER PUBLICATIONS

Machine Translation for JP Applicaton Pub 2005-136697, IPDL (Industrial Property Digital Libraty), May 2005, Inventor: Takano Katsuji; Assignee: Casio Comput Co Ltd.*
(Continued)

*Primary Examiner* — Roberto Velez
*Assistant Examiner* — Cynthia Segura
(74) *Attorney, Agent, or Firm* — Oblon, McClelland, Maier & Neustadt, L.L.P.

(57) ABSTRACT

An imaging apparatus includes: a reading device that reads a recording file on which a plurality of groups of information of character strings are stored in advance; a displaying device that displays any one group of the plurality of groups of the information of character strings; a selecting device that selects one desired group of information of character strings from the plurality of groups of the information of character strings; and a recording device that records shooting completion information that indicates shooting corresponding to the one desired group of the information of character string has been completed on the recording file, when shooting is performed in a state where the one desired group of the information of character string is selected, wherein when one group of the plurality of groups of the information of character strings is selected and displayed, based on the shooting completion information, the displaying device displays the selected one group of the information of character strings, and a display of completed shooting information that indicates an image corresponding to the selected one group of the information of character strings has been shot together.

8 Claims, 5 Drawing Sheets

```
// CAMERA MEMO FILE
//**1 PREFECTURE
//**1-1 KANAGAWA
//**1-2 TOKYO
//**1-3 IBARAKI
//**1-4 KANAGAWA
//**1-5 TOKYO
//**1-6 IBARAKI
//**2 MUNICIPALITY
//**2-1 YOKOHAMA CITY
//**2-2 MINATO WARD
//**2-3 KASHIMA CITY
//**2-4 KAWASAKI CITY
//**2-5 SHIBUYA WARD
//**2-6 MITO CITY
//**3 AREA
//**3-1 NORTH AREA
//**3-2 SOUTH AREA
//**3-3 EAST AREA
//**3-4 WEST AREA
//**3-5 NORTH AREA
//**3-6 NORTH AREA
//· 0, 1, 0, 0, 0, 0  ←0:SHOOTING HAS NOT BEEN COMPLETED, 1:SHOOTING HAS BEEN COMPLETED
           (FROM LEFT, CAMERA MEMOS 1, 2, 3, ··· )
```

(51) Int. Cl.
*H04N 1/32* (2006.01)
*H04N 5/77* (2006.01)
*H04N 9/804* (2006.01)
*H04N 9/82* (2006.01)
*H04N 101/00* (2006.01)

(52) U.S. Cl.
CPC ........... *H04N 9/8042* (2013.01); *H04N 9/8205* (2013.01); *H04N 2101/00* (2013.01); *H04N 2201/3219* (2013.01); *H04N 2201/3232* (2013.01); *H04N 2201/3247* (2013.01); *H04N 2201/3253* (2013.01); *H04N 2201/3273* (2013.01); *H04N 2201/3274* (2013.01)
USPC .................... 348/231.3; 348/333.01; 707/803

(56) References Cited

U.S. PATENT DOCUMENTS

| | | | |
|---|---|---|---|
| 8,531,532 B2 * | 9/2013 | Imamura et al. | 348/207.1 |
| 2001/0041056 A1 | 11/2001 | Tanaka et al. | |
| 2001/0048774 A1 | 12/2001 | Seki et al. | |
| 2004/0090526 A1 * | 5/2004 | Watanabe et al. | 348/207.1 |
| 2007/0061856 A1 | 3/2007 | Seki et al. | |
| 2007/0061857 A1 | 3/2007 | Seki et al. | |
| 2008/0166057 A1 * | 7/2008 | Nakajima | 382/229 |
| 2008/0295031 A1 | 11/2008 | Miyazaki | |
| 2009/0174768 A1 * | 7/2009 | Blackburn et al. | 348/130 |
| 2009/0232468 A1 | 9/2009 | Liu | |
| 2009/0245752 A1 | 10/2009 | Koike | |
| 2011/0199511 A1 | 8/2011 | Takahashi et al. | |

FOREIGN PATENT DOCUMENTS

| | | | | |
|---|---|---|---|---|
| EP | 2 101 185 A2 | | 9/2009 | |
| JP | 2002-158953 | | 5/2002 | |
| JP | 2004-023269 | | 1/2004 | |
| JP | 2004023269 A | * | 1/2004 | ............... H04N 5/91 |
| JP | 2005-136697 | | 5/2005 | |
| JP | 2005136697 A | * | 5/2005 | ............ H04N 5/225 |
| JP | 2008-211837 | | 9/2008 | |
| JP | 2009-239696 | | 10/2009 | |
| WO | WO 2010/047336 A1 | | 4/2010 | |

OTHER PUBLICATIONS

Machine Translation for JP Applicaton Pub 2004-023269, IPDL (Industrial Property Digital Libraty), Jan. 2004, Inventor: Nishimura Toru; Assignee: Fuji Photo Film Co Ltd.*
Office Action issued Jan. 7, 2014 in Japanese Patent Application No. 2010-174416.
International Search Report issued Sep. 6, 2011 in PCT/JP2011/067818 filed Jul. 28, 2011.
Extended European Search Report issued Jul. 24, 2014 in Patent Application No. 11814686.9.

* cited by examiner

FIG. 1A
TOP VIEW

FIG. 1B
FRONT VIEW

FIG. 1C
REAR VIEW

|  | CLASSIFIED ITEM 1 | CLASSIFIED ITEM 2 | CLASSIFIED ITEM 3 |
|---|---|---|---|
| NAME OF CLASSIFIED ITEM | PREFECTURE | MUNICIPALITY | AREA |
| CAMERA MEMO CONTENT 1 | KANAGAWA | YOKOHAMA CITY | NORTH AREA |
| CAMERA MEMO CONTENT 2 | TOKYO | MINATO WARD | SOUTH AREA |
| CCAMERA MEMO CONTENT 3 | IBARAKI | KASHIMA CITY | EAST AREA |
| CAMERA MEMO CONTENT 4 | KANAGAWA | KAWASAKI CITY | WEST AREA |
| CAMERA MEMO CONTENT 5 | TOKYO | SHIBUYA WARD | NORTH AREA |
| CAMERA MEMO CONTENT 6 | IBARAKI | MITO CITY | NORTH AREA |

FIG. 4

```
// CAMERA MEMO FILE
//**1 PREFECTURE
//**1-1 KANAGAWA
//**1-2 TOKYO
//**1-3 IBARAKI
//**1-4 KANAGAWA
//**1-5 TOKYO
//**1-6 IBARAKI
//**2 MUNICIPALITY
//**2-1 YOKOHAMA CITY
//**2-2 MINATO WARD
//**2-3 KASHIMA CITY
//**2-4 KAWASAKI CITY
//**2-5 SHIBUYA WARD
//**2-6 MITO CITY
//**3 AREA
//**3-1 NORTH AREA
//**3-2 SOUTH AREA
//**3-3 EAST AREA
//**3-4 WEST AREA
//**3-5 NORTH AREA
//**3-6 NORTH AREA
//·· 0, 1, 0, 0, 0, 0   ←0:SHOOTING HAS NOT BEEN COMPLETED, 1:SHOOTING HAS BEEN COMPLETED
            (FROM LEFT, CAMERA MEMOS 1, 2, 3, ··· )
```

IMAGING APPARATUS AND IMAGING METHOD FOR RECORDING SHOOTING COMPLETION INFORMATION

TECHNICAL FIELD

The present invention relates to an imaging apparatus and an imaging method. In particular, the present invention relates to an imaging apparatus that is capable of reading a file on which information of a character string is stored and using it.

BACKGROUND ART

In recent years, with the widespread use of digital cameras, the usage range thereof has increased from general use to business use.

Due to such an increase of the usage range of digital cameras, various functions have been added thereto.

For example, at a construction site, photographic recording is mandatory, scenes to be shot as a record are predetermined, and it is necessary to record all the scenes with the shooting date, time, place, and so on.

Thus, the need for shooting all of the predetermined scenes has increased.

However, a technique regarding an imaging apparatus capable of easily preventing forgetting to shoot has not been suitably developed.

In Japanese patent application publication number 2009-239696, an imaging apparatus capable of storing information of a character string shot in advance by the use of a digital camera by a user in association with a shot image has been disclosed.

However, in the imaging apparatus disclosed in Japanese patent application publication number 2009-239696, it is necessary for a user to shoot information of a character string including shooting date, place, and so on in advance, and a troublesome operation to associate the information of the character string with the shot image is required.

And since there is no function to prevent forgetting to shoot in the imaging apparatus disclosed in Japanese patent application publication number 2009-239696, it is not possible to prevent forgetting to shoot.

Japanese patent number 4124402 discloses an imaging apparatus such that a shooting list including names of scenes of objects to be recorded is inputted in advance, and in a case where a name of a scene included in the shooting list displayed on a screen is selected and shooting is performed, data of the shot image is recorded in association with the selected name of the scene.

However, in the imaging apparatus disclosed in Japanese patent number 4124402, it is necessary to select a shooting list and a name of a scene each, and this makes operations troublesome when shooting. And in the imaging apparatus disclosed in Japanese patent number 4124402, since shooting completion information is all deleted in a case of selecting a shooting list and in a case of turning off the power, it is necessary to shoot all the scenes corresponding to names of scenes included in a shooting list at one time, and therefore it can hardly be said to be user-friendly.

SUMMARY OF THE INVENTION

An object of the present invention is to provide an imaging apparatus capable of easily preventing forgetting to shoot in a case of shooting a plurality of predetermined scenes, and to an imaging method.

In order to achieve the above object, the embodiment of the present invention provides: an imaging apparatus comprising: a reading device that reads a recording file on which a plurality of groups of information of character strings including at least one character string are stored in advance; a displaying device that displays any one group of the plurality of groups of the information of character strings read by the reading device; a selecting device that selects one desired group of the information of character strings from the plurality of groups of the information of character strings; and a recording device that records shooting completion information that indicates shooting corresponding to the one desired group of the information of character strings has been completed on the recording file, when shooting is performed in a state where the one desired group of the information of character strings is selected by the selecting device, wherein when one group of the plurality of groups of the information of character strings is selected by the selecting device and displayed by the displaying device, based on the shooting completion information recorded on the recording file, the displaying device displays the selected one group of the plurality of groups of the information of character strings, and a display of completed shooting that indicates an image corresponding to the selected one group of the plurality of groups of the information of character strings has been shot together.

In order to achieve the above object, the embodiment of the present invention provides: an imaging method comprising: a step of reading a recording file on which a plurality of groups of information of character strings including at least one character string are stored in advance; a step of displaying any one group of the plurality of groups of the information of character strings read in the step of reading; a step of selecting one desired group of the information of character strings from the plurality of groups of the information of character strings; and a step of recording shooting completion information that indicates shooting corresponding to the one desired group of the information of character strings has been completed on the recording file, when shooting is performed in a state where the one desired group of the information of character string is selected in the step of selecting; wherein when one group of the plurality of groups of the information of character strings is selected in the step of selecting, and displayed in the step of displaying, the step of displaying displays the selected one group of the plurality of groups of the information of character strings, and a display of completed shooting that indicates an image corresponding to the selected one group of the plurality of groups of the information of character strings has been shot together.

DESCRIPTION OF EMBODIMENTS

Hereinafter, an embodiment of the present invention will be explained with reference to drawings.

Figure 1A:
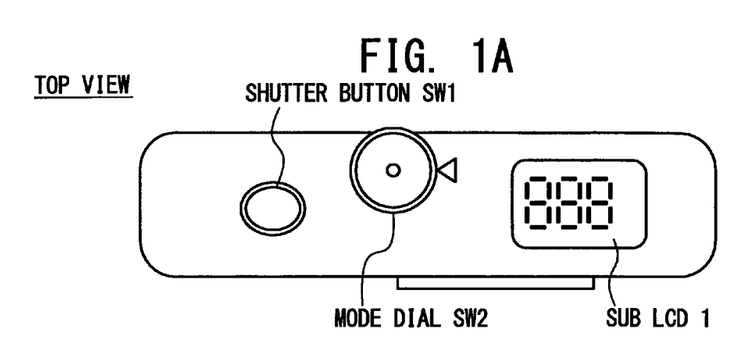
FIGS. 1A to 1C are external diagrams of a digital camera according to an embodiment of the present invention. Each of FIGS. 1A to 1C is a top view, a front view, and a rear view of the digital camera, respectively.
Figure 1B:
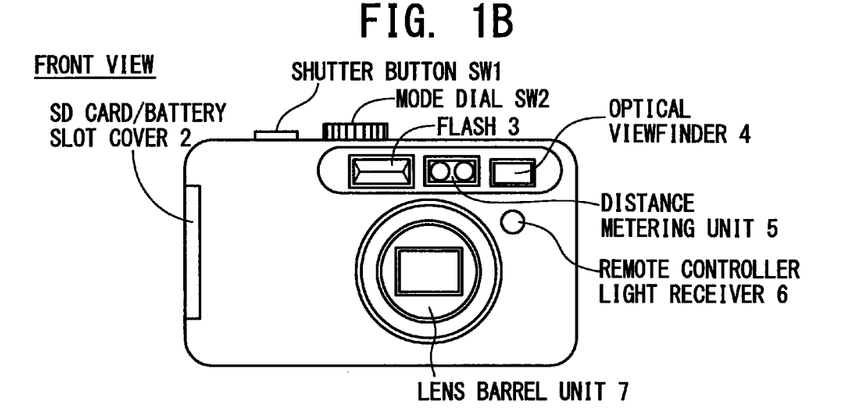
Figure 1C:
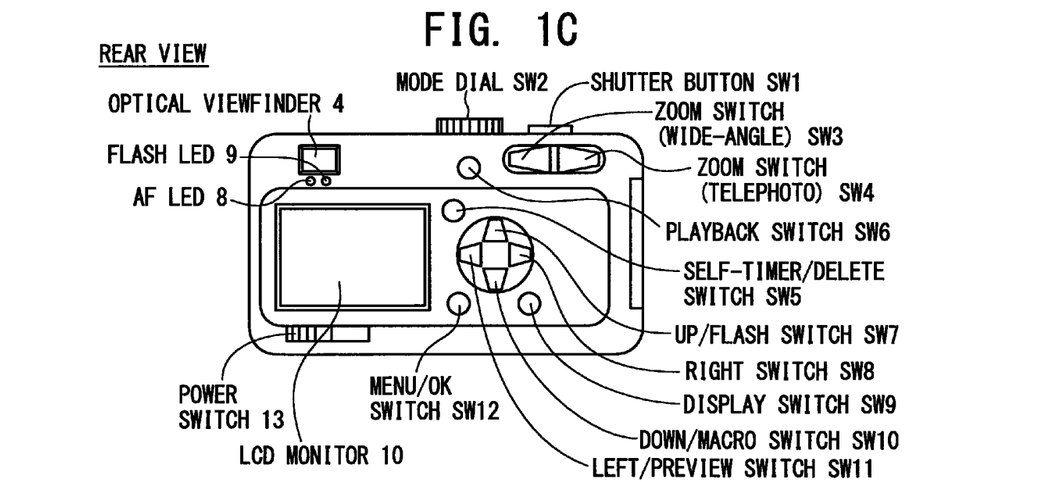

FIGS. 1A to 1C are external diagrams of a digital camera as an example of an imaging apparatus according to the embodiment of the present invention.

As illustrated in FIG. 1A to 1C, on a top part of the digital camera, a shutter button SW1, a mode dial SW which changes operation modes of the digital camera, and a sub LCD 1 which displays shooting information and so on are provided.

On a front part of the digital camera, a lens barrel unit 7 which forms an optical image of a photographic subject, a remote controller light receiver 6, a distance metering unit 5, an optical viewfinder 4, and a flash 3 are provided.

On a side part of the digital camera, an SD card/battery cover 2 is provided.

On a rear part of the digital camera, an LCD monitor 10, the optical viewfinder 4, an AF LED 8, a flash LED 9, and a plurality of switches SW3 to SW13 are provided.

Figure 2:
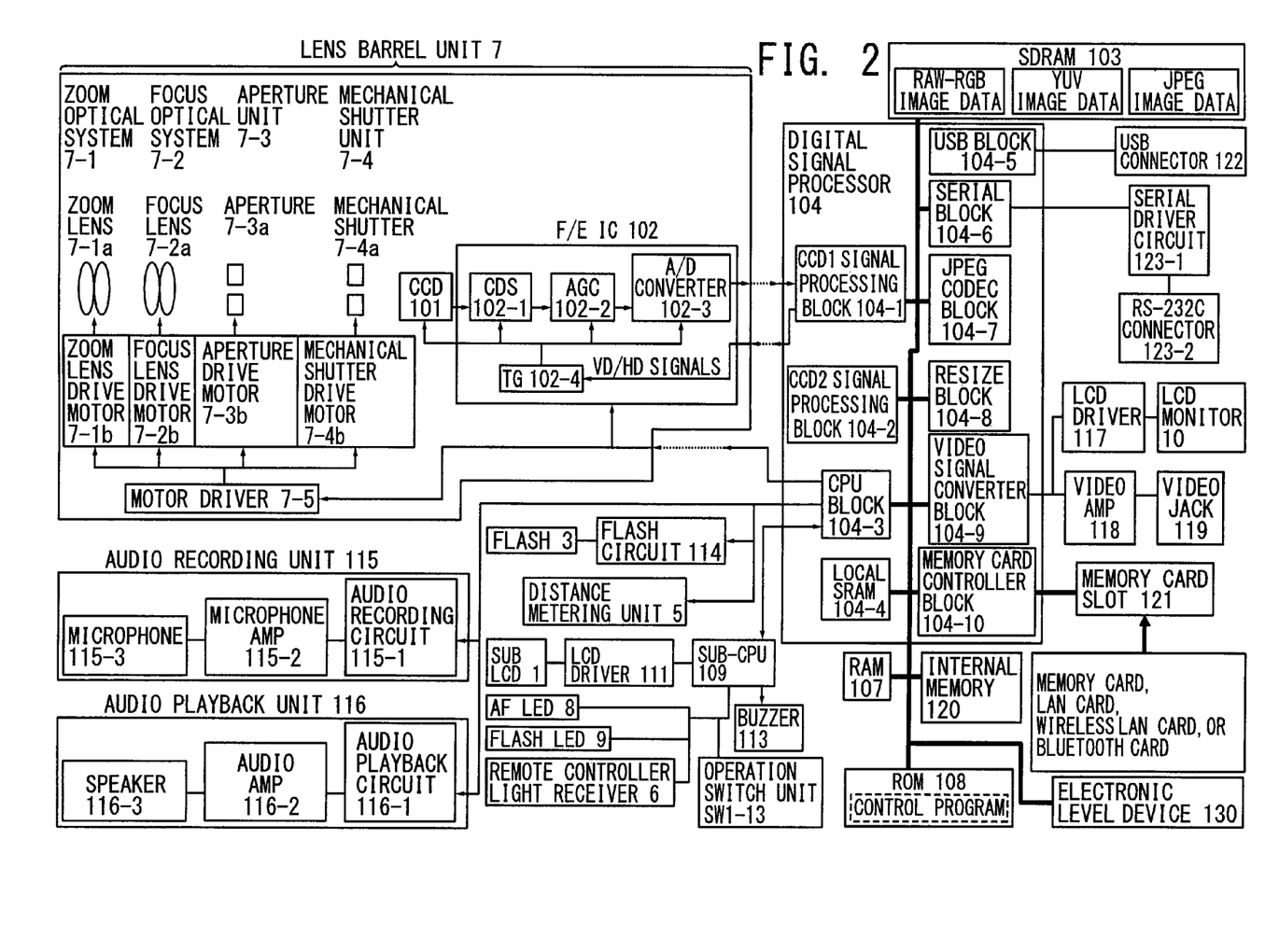
FIG. 2 is a block diagram illustrating a constitution of the digital camera according to the embodiment of the present invention.

FIG. 2 is a block diagram illustrating a constitution of the digital camera as the example of the imaging apparatus according to the embodiment of the present invention.

As illustrated in FIG. 2, the digital camera according to the present embodiment includes the lens barrel unit 7, a digital signal processor 104, an SDRAM 103, a RAM 107, a ROM 108, and a sub-CPU 109.

The lens barrel unit 7 has a zoom optical system 7-1 including a zoom lens 7-1a, and a zoom lens drive motor 7-1b, a focus optical system including a focus lens 7-2a, and a focus lens drive motor 7-2b, an aperture unit 7-3 including an aperture 7-3a, and an aperture drive motor 7-3b, a mechanical shutter unit 7-4 including a mechanical shutter 7-4a, and a mechanical shutter drive motor 7-4b, a motor driver 7-5 which drives each of the above drive motors, a CCD 101, and a F/E (front/end)-IC 102.

The CCD 101 is a semiconductor-type image sensor which converts an optical image into an electric signal.

The CCD 101 outputs an analog image signal corresponding to the optical image formed on its light-receiving surface.

The F/E-IC 102 has a CDS 102-1 which performs a correlated double sampling for an image noise reduction, an AGC 102-2 which performs a gain control, an A/D converter 102-3 which converts an analog signal into a digital signal, and a TG 102-4 which generates a drive timing signal of the CCD 101 based on a vertical synchronizing signal (hereinafter, VD) and a horizontal synchronizing signal (hereinafter, HD) outputted from the digital signal processor 104.

The F/E-IC 102 converts the analog image signal outputted from the CCD 101 into a digital image signal.

In the digital camera according to the present embodiment, the lens barrel unit 7 is structured integrally, and is freely attachable/detachable to/from a camera body.

Various lens barrel units such as those having various zoom scales and variously-sized CCDs are prepared as the lens barrel unit 7.

The digital signal processor 104 has a CCD1 signal processing block 104-1, a CCD2 signal processing block 104-2, a CPU block 104-3, a local SRAM 104-4, a USB block 104-5, a serial block 104-6, a JPEG CODEC block 104-7, a RESIZE block 104-8, a video signal converter block 104-9, and a memory card controller block 104-10.

The CCD1 signal processing block 104-1 outputs the VD signal and HD signal, and converts the digital image signal converted by the F/E-IC 102 into image data such as brightness data, color difference data, and so on.

The CCD2 signal processing block 104-2 performs white balance correction and gamma correction by filtering processing.

The CPU block 104-3 controls operation of the F/E-IC 102 and the motor driver 7-5, and controls operation of each part of the digital camera.

The local SRAM 104-4 temporarily stores necessary data and the like for control.

The USB block 104-5 performs USB communication with external devices such as a PC, and so on.

The serial block 104-6 performs serial communication with external devices such as a PC, and so on.

The JPEG CODEC block 104-7 performs JPEG compression and decompression on image data.

The RESIZE block 104-8 enlarges and reduces the size of image data.

The video signal converter block 104-9 converts image data into a video signal to be displayed on an LCD monitor, TV, and so on.

The memory card controller block 104-10 performs control on a memory card to record shot image data.

In the ROM 108, a control program and a control parameter to control the digital camera are stored, and the control program is executed by the CPU block 104-3.

When the power of the digital camera is on, the control program is loaded in a main memory (not illustrated), and the CPU block 104-3 controls operation of each part of the digital camera in accordance with the control program loaded in the main memory.

Necessary data and the like while controlling are temporarily stored in the RAM 107, and the local SRAM 104-4 included in the digital signal processor 104.

As the ROM 108, using a flash ROM which is data-rewritable makes it possible to change the control program and the parameter to control, and therefore it is easily possible to upgrade a function.

The SDRAM 103 temporarily stores image data converted by the CCD1 signal processing block 104-1.

The digital signal processor 104 performs various processings on the image data temporarily stored in the SDRAM 103, and the SDRAM 103 temporarily stores the data again.

Image data stored in the SDRAM 103 are, for example, RAW-RGB image data, YUV image data, JPEG image data, and so on.

The RAW-RGB image data is image data on which white balance correction and gamma correction are performed.

The YUV image data is image data on which brightness data and color difference data conversion is performed by the CCD2 signal processing block 104-2.

The JPEG image data is image data on which JPEG compression is performed.

A memory card slot 121 is a slot in which a memory card is inserted. A LAN card, a wireless LAN card, a Bluetooth card, or the like can be also inserted in the memory card slot 121.

An internal memory 120 records shot image data.

For example, even in a case where a memory card is not inserted in the memory card slot 121, the internal memory 120 records shot image data.

In the internal memory 120, setting information of a flash mode setting, a picture quality setting, a shot image size setting, and the like is stored, and even when the power of the digital camera is off, the above setting information is maintained.

When turning on the power again, the above setting information is read by the CPU block 104-3, and each part of the digital camera is set, and therefore it is possible to restore the setting state of the digital camera before turning off the power after turning on the power.

The digital camera according to the present embodiment further includes an LCD monitor 10, an LCD driver 117, a video AMP 118, a video jack 119, a USB connector 122, a serial driver circuit 123-1, an RS-232C connector 123-2, and an electronic level device 130.

The LCD driver 117 converts a video signal outputted from the video signal converter block 104-9 to a signal for the LCD monitor 10, and drives the LCD monitor 10.

On the LCD monitor 10, a live preview of a photographic subject when shooting, a preview display of a shot image, a display of image data recorded in the memory card and the internal memory 120, and so on are performed.

The video AMP 118 converts an output impedance of the video signal converter block 104-9 to an input impedance (75Ω) of an external display device such as TV and the like, and outputs it to the video jack 119.

The USB connector 122 is used for a USB connection to an external device such as a PC, or the like.

The RS-232C connector 123-2 is used for a serial connection to an external device such as a PC or the like.

The serial driver circuit 123-1 converts an output signal of the serial block 104-6 to a serial signal.

The digital camera of the present embodiment further includes an LCD driver 111, and a buzzer 113. The LCD driver 111 and the buzzer 113 are connected to the sub-CPU 109.

The sub-CPU 109 is a CPU which includes a ROM and a RAM in one chip, and controls the sub LCD 1, the AF LED 8, the flash LED 9, and the buzzer 113, based on a control signal from the CPU block 104-3, and obtains an output signal of an operation switch unit SW1-SW13 and the remote controller light receiver 6 as operation information of a user, and outputs it to the CPU block 104-3.

The sub LCD 1 is a display that displays the number of photographable images and so on.

The LCD driver 111 drives the sub LCD 1 by a control signal outputted from the sub-CPU 109.

The AF LED 8 is an LED which indicates a focusing state when shooting.

The flash LED 9 is an LED which indicates a charging state of the flash 3.

The AF LED 8 and the flash LED 9 can be also used for another purpose that indicates a data access state between the camera body and the memory card, for example.

The operation switch unit SW1-SW13 is a circuit which outputs a signal in a case where each of the operation switch unit SW1-SW13 is operated by a user.

The remote controller light receiver 6 receives a signal from a remote controller exclusively for the digital camera.

The digital camera according to the present embodiment further includes an audio recording unit 115 and an audio playback unit 116.

The audio recording unit 115 has a microphone 115-3, a microphone AMP 115-2, and an audio recording circuit 115-1.

The microphone AMP 115-2 amplifies an audio signal converted by the microphone 115-3.

The audio recording circuit 115-1 converts the audio signal amplified by the microphone AMP 115-2 to digital audio data.

The audio playback unit 116 has an audio playback circuit 116-1, an audio AMP 116-2, and a speaker 116-3.

The audio playback circuit 116-1 converts the digital audio data to an audio signal.

The audio AMP 116-2 amplifies the audio signal converted by the audio playback circuit 116-1 and outputs it to the speaker 116-3.

The digital camera according to the present embodiment further includes a flash circuit 114 which flashes the flash 3, and the flash circuit 114 is controlled by the CPU block 104-3.

The distance metering unit 5 is controlled by the CPU block 104-3.

The electronic level device 130 detects a tilt angle of the digital camera, and outputs the detected tilt angle as data.

Next, hereinafter a specific example of a usage of information of character strings in the digital camera will be explained.

Figure 5:
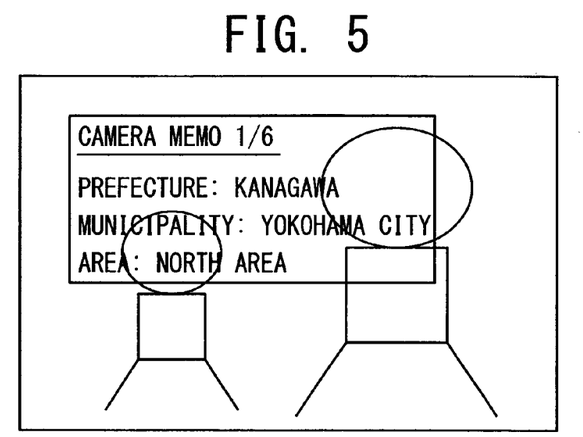
FIG. 5 is a diagram illustrating an example of a display of a camera memo displayed on the imaging apparatus according to the embodiment of the present invention.
Figure 6:
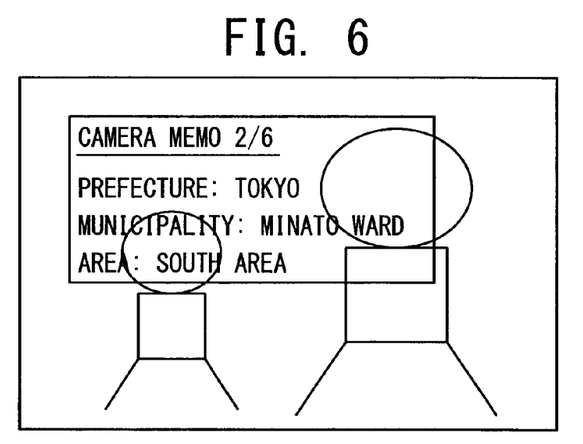
FIG. 6 is a diagram illustrating another example of a display of a camera memo displayed on the imaging apparatus according to the embodiment of the present invention.

FIGS. 5 and 6 are diagrams illustrating examples of displays of camera memos displayed on the LCD monitor 10 of the digital camera according to the present embodiment.

In the digital camera according to the present embodiment, for example, camera memos (1/6, 2/6, . . . , 6/6) as a plurality of groups of information of character strings including a camera memo (1/6) as information of character strings including a group of character strings such as "Kanagawa", "Yokohama city", and "north area" illustrated in FIG. 5, and a camera memo (2/6) as information of the character strings including a group of character strings such as "Tokyo", "Minato ward", and "south area" illustrated in FIG. 6 are displayed on the LCD monitor 10.

Additionally, names of classified items such as "prefecture", "municipality" and "area" are also included in the character strings of the camera memo as information of character strings.

<Recording Information of Character Strings on Digital Camera>

Figure 3:
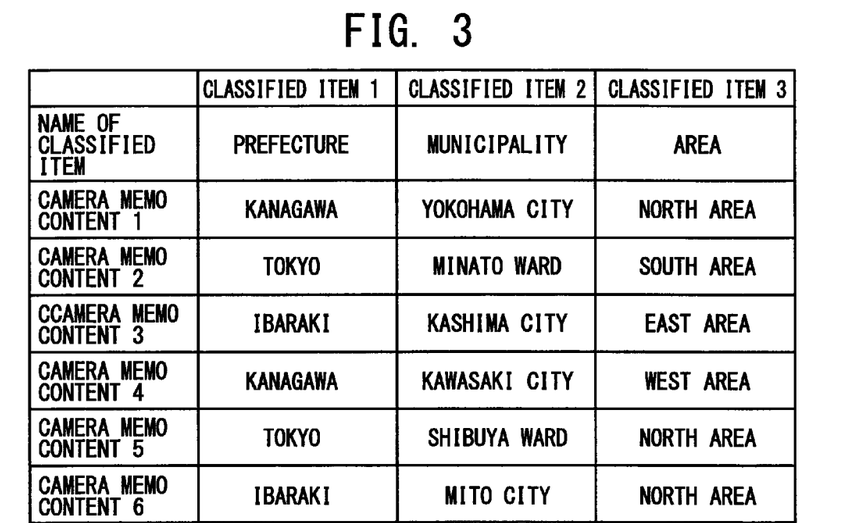
FIG. 3 is an example of a table of names of classified items and contents (character strings) corresponding to each classified item used in the imaging apparatus according to the embodiment of the present invention.

FIG. 3 is a table illustrating an example of names of classified items and contents (character strings) corresponding to each classified item displayed on the digital camera according to the present embodiment.

Figure 4:
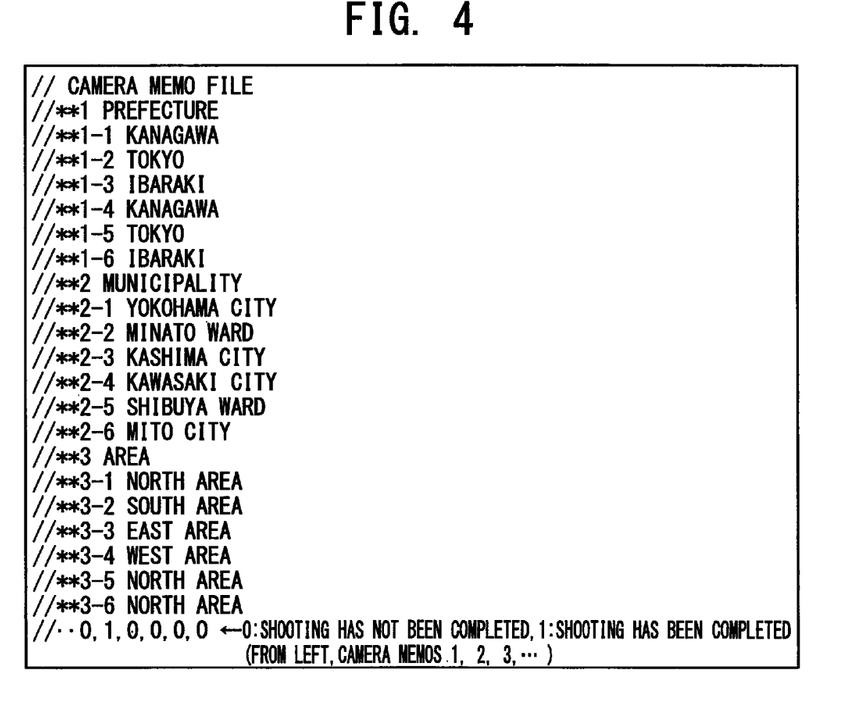
FIG. 4 is an example of a format of a camera memo file used in a case of recording information of character strings in the imaging apparatus according to the embodiment of the present invention.

FIG. 4 is a diagram illustrating an example of a camera memo file (recording file) which is used in a case of recording information of character strings on the digital camera according to the present embodiment.

Firstly, a user uses a PC, or the like and prepares a camera memo file on which a plurality of groups of information of character strings are recorded to be displayed on the LCD monitor 10 of the digital camera in advance.

Thus, a user can prepare the user's own camera memo file.

Additionally, a user can download a prepared camera memo file from a predetermined server, or the like and use it.

For example, on a camera memo file according to the present embodiment, character strings ("prefecture", "municipality", and "area") that express names of classified items set as items of a camera memo, and six groups of character strings ("Kanagawa", "Yokohama city", "north area", and so on) that express contents corresponding to each classified item are recorded.

More specifically, groups of character strings such as "Kanagawa", "Yokohama city", and "north area" as camera memo content 1, and "Tokyo", "Minato ward", and "south area" as camera memo content 2 are respectively recorded corresponding to character strings of "prefecture" (classified item 1), "municipality" (classified item 2), and "area" (classified item 3), which are names of the classified items.

FIG. 4 is a diagram illustrating an example of a format of a camera memo file used in a case of recording information of character strings on the digital camera according to the present embodiment.

On a camera memo file, a character string included in the information of character strings is written as text per line.

On a line on which the character string included in the information of character strings is written, a symbol string "//**" is written at the beginning of the line.

In a case where after the symbol string "//**", one numeric character is written, and a space is written after the one numeric character, a character string after the space is a name of a classified item in a classified item expressed by a classified item number which is expressed by the one numeric character.

And, in a case where after the symbol string "//**", "a first numeric character-(hyphen) a second numeric character" is written and a space is written, a character string after the space corresponds to a content (character string) in a classified item expressed by a classified item number which is expressed by the first numeric character, and a camera memo content expressed by a camera memo content number which is expressed by the second numeric character.

A camera memo file is recorded with an extension ".mta".

It is preferable that a camera memo file be stored on a storage medium such as a memory card freely attachable/detachable to/from a digital camera, and the camera memo file be loaded in the digital camera from the storage medium and be used.

For example, by storing each of different camera memo files corresponding to various situations on a plurality of storage media (memory cards) freely attachable/detachable to/from a digital camera, depending on a situation, only attaching an appropriate memory card to a digital camera and loading a camera memo file stored on the memory card in the digital camera make it possible to display a display of a camera memo depending on the situation, and therefore, it is possible to prevent forgetting to shoot in the various situations.

Additionally, since only a minimum number of camera memos have to be recorded on per storage medium, unnecessary camera memos are not read in a case of reading a camera memo, and the usability is favorable.

[Displaying Camera Memo on Digital Camera]

The digital camera starts operation, after a memory card as a storage medium, for example, an SD card, on which a camera memo file on which camera memos have been already recorded is stored, is attached to the digital camera.

After the start of the operation of the digital camera, when a right switch SW8 is pressed, the camera memo file is read by a reading device included in the digital camera (step of reading), and a display of a camera memo is displayed on the LCD monitor 10 of the digital camera by a displaying device included in the digital camera (step of displaying).

FIG. 5 is an example of a display of a camera memo displayed on the digital camera according to the present embodiment.

FIG. 6 is another example of a display of a camera memo displayed on the digital camera according to the present embodiment.

Firstly, contents (character strings) corresponding to each classified item in a first camera memo (for example, camera memo content 1 in an example illustrated in FIG. 3) are displayed (See FIG. 5).

In the present embodiment, names of classified items are also displayed with contents (character strings) corresponding to each classified item on the LCD monitor 10.

Hereinafter, a display of the names of the classified items and the contents (character strings) corresponding to each classified item displayed on the LCD monitor 10 is called a display of a camera memo.

Here, when the right switch SW8 is pressed again, as illustrated in FIG. 6, with the names of the classified items, the contents (character strings) corresponding to each classified item in a second camera memo (for example, "camera memo content 2" in an example illustrated in FIG. 3) are selected by a selecting device included in the digital camera and displayed (step of selecting).

And then, each time the right switch SW8 is pressed, contents corresponding to each classified item in a third camera memo ("camera memo content 3" in an example illustrated in FIG. 3), contents corresponding to each classified item in a fourth camera memo ("camera memo content 4" in an example illustrated in FIG. 3), contents corresponding to each classified item in a fifth camera memo ("camera memo content 5" in an example illustrated in FIG. 3), and so on are displayed in ascending order of a camera memo number.

On the other hand, each time a left/preview switch SW11 is pressed, a camera memo is displayed in reverse order of the case where the right switch SW8 is pressed (in descending order of the camera memo number).

As illustrated in FIG. 3, in the present embodiment, since six camera memos are recorded on a camera memo file, displays of the first camera memo (1/6) to a sixth camera memo (6/6) can be displayed as the display of the camera memo.

In a camera memo shooting mode according to the present embodiment, when shooting is performed in a state where one of the displays of camera memos is selected and displayed, the contents (character strings) corresponding to each classified item displayed when shooting are recorded as an image on a shot image file.

Additionally, at this time, the names of the classified items are recorded corresponding to the contents (character strings) corresponding to each classified item together.

In the present embodiment, as illustrated in FIGS. 5 and 6, while monitoring (while live previewing), it is preferable that a display of a camera memo be displayed with an image of a photographic subject on the LCD monitor 10; however only the display of the camera memo can be displayed on the LCD monitor 10.

[Recording Shooting Completion Information]

When shooting is performed in a state where a display of a camera memo is selected by the selecting device and displayed, information that indicates shooting has been completed corresponding to the camera memo of the display of the camera memo, which is recorded on the camera memo file, is called "shooting completion information".

In the present embodiment, as illustrated in FIG. 4, a string of numbers of "0" and "1" is recorded on a last line of the camera memo file.

On the last line of the camera memo file illustrated in FIG. 4, a number "0" denotes that shooting has not been completed, and a number "1" (a flag of completed shooting as shooting completion information) denotes that shooting has been completed.

In order from the left, whether or not each of the shootings corresponding to the first camera memo, the second camera memo, the third camera memo, . . . , and the sixth camera memo has been completed is expressed.

For example, in the camera memo shooting mode, when shooting is performed in a state where a display of a camera memo (2/6) corresponding to the second camera memo is displayed (see FIG. 6), by a recording device included in the digital camera, on a last line of the camera memo file, a flag of completed shooting "1" that indicates the shooting corresponding to the second camera memo has been completed is recorded on the second of the string of numbers (step of recording).

Thus, since shooting completion information is recorded on the camera memo file with the names of the classified items and the contents (character strings) corresponding to each classified item, the shooting completion information is also on a memory card on which the camera memo file is stored with the names of the classified items and the contents (character strings) corresponding to each classified item.

Therefore, for example, even when the memory card on which the shooting completion information is stored is attached to another digital camera according to the present embodiment different from the digital camera according to the present embodiment by which shooting has been performed, the shooting completion information can be used.

Here, a difference between the imaging apparatus disclosed in Japanese patent number 4124402 and the imaging apparatus (digital camera) according to the present embodiment will be explained in detail.

In the imaging apparatus disclosed in Japanese patent number 4124402, shot image data corresponding to a name of a scene is stored inseparably with data of the name of the scene; therefore it is not possible to manage (copy, move, and so on) the shot image data and the data of the name of the scene independently.

On the other hand, in the imaging apparatus according to the embodiment of the present invention, the shooting completion information is recorded with the names of the classified items and the contents (contents) corresponding to each classified item on the recording file (camera memo file) independent from the shot image data.

Therefore, in the imaging apparatus according to the present embodiment, it is possible to delete the shooting completion information as independent data from the shot image data by, for example, a deleting device.

And, in the imaging apparatus according to the present embodiment, even in a case where only the shot image data is moved to a different storage medium, it is possible to leave the shooting completion information recorded on the camera memo file without moving, and display the shooting completion information without the shot image data.

[Displaying Shooting Completion Information]

Figure 7:
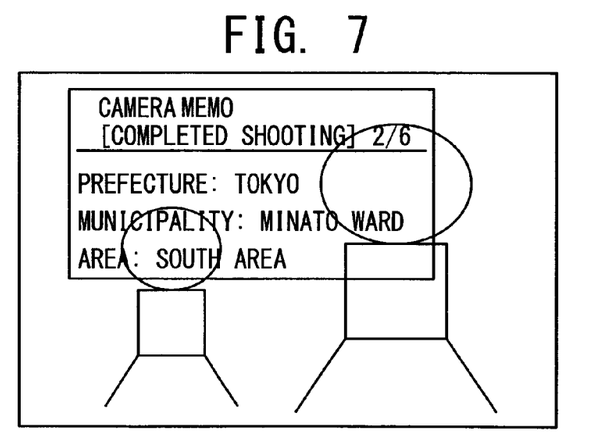
FIG. 7 is a diagram illustrating a state where a display of "completed shooting" is displayed with the display of the camera memo illustrated in FIG. 6.

FIG. 7 is a diagram illustrating a state where a display of completed shooting is displayed with the display of the camera memo illustrated in FIG. 6 on the LCD monitor 10.

As illustrated in FIG. 7, when one of the camera memos is selected by the selecting device, and a display of a camera memo of the selected camera memo is displayed by the displaying device, based on the shooting completion information recorded on the camera memo file, the displaying device displays the display of the camera memo of the selected camera memo and a display of "completed shooting" that indicates an image corresponding to the selected camera memo has been already shot together on the LCD monitor 10.

[Delete Operation of Shooting Completion Information]

A delete operation for individually deleting the shooting completion information will be explained.

Figure 8:
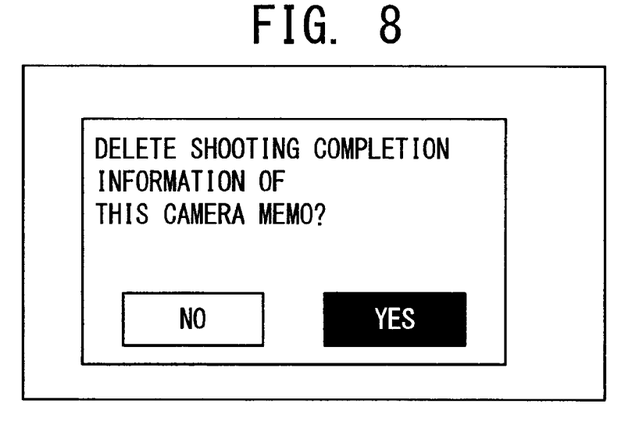
FIG. 8 is a diagram illustrating an example of a screen to select whether or not to delete shooting completion information corresponding to the display of the camera memo displayed on the screen.

FIG. 8 is a diagram illustrating an example of a screen to select whether or not to delete the shooting completion information corresponding to the displayed display of the camera memo.

Here, a case of deleting the flag of completed shooting "1" as the shooting completion information corresponding to one of the camera memos (changing the flag of completed shooting "1" to "0") will be explained.

In the digital camera according to the present embodiment, when one of the camera memos is selected by the selecting device, and the delete operation is performed in a state where a display of a camera memo of the selected camera memo is displayed by the displaying device, by a deleting device included in the digital camera, the flag of completed shooting "1" as the shooting completion information recorded on the camera memo file corresponding to the selected camera memo is deleted (the flag of completed shooting "1" is changed to "0").

Specifically, while displaying the display of the camera memo with which the display of "completed shooting" is displayed (see FIG. 7), when a self-timer/delete switch SW5 of the digital camera is pressed, a confirmation screen to confirm whether or not to delete the flag of completed shooting "1" as the shooting completion information corresponding to the display of the camera memo with which the display of "completed shooting" is displayed ("Yes" or "No") is displayed (see FIG. 8).

At this time, when "Yes" is selected, and a MENU/OK switch SW12 is pressed, by the deleting device, the flag of completed shooting "1" as the shooting completion information corresponding to the camera memo is deleted (the flag of completed shooting "1" is changed to "0") (step of deleting).

[All Delete Operation of Shooting Completion Information]

An all delete operation for deleting all the shooting completion information will be explained.

Figure 9:
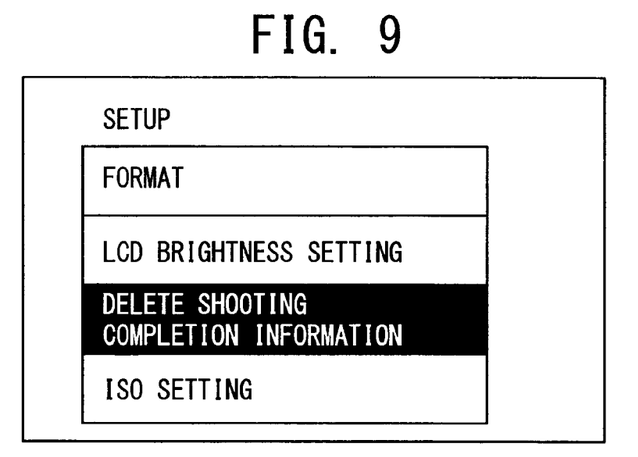
FIG. 9 is a diagram of an example of a setup menu illustrating a state where "delete shooting completion information" that is selected in a case of deleting all the shooting completion information is selected.

FIG. 9 is a diagram of an example of a setup menu illustrating a state where "delete shooting completion information" that is selected in a case of deleting all the shooting completion information is selected.

Figure 10:
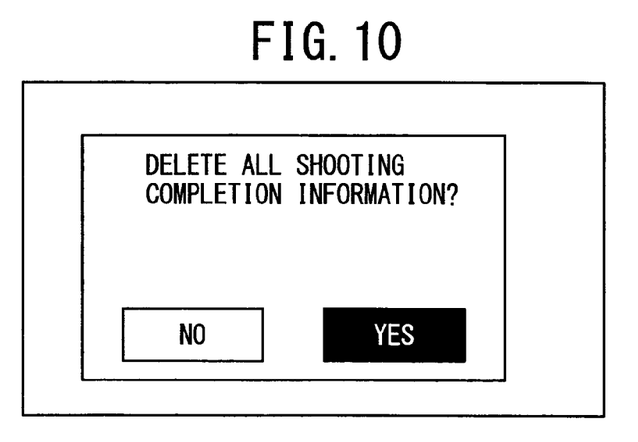
FIG. 10 is a diagram illustrating an example of the screen to confirm whether or not to delete all the shooting completion information.

FIG. 10 is a diagram illustrating an example of a screen to confirm whether or not to delete all the shooting completion information.

In the digital camera according to the present embodiment, in a case where the all delete operation is performed, by an all deleting device included in the digital camera, flags of completed shooting "1" as the shooting completion information recorded on the camera memo file are all deleted (all flags of completed shooting "1" are changed to "0").

Specifically, firstly, the setup menu illustrated in FIG. 9 is displayed on the LCD monitor 10, and then "delete shooting completion information" is selected (see FIG. 10).

Next, when the MENU/OK switch SW12 is pressed, a confirmation screen to confirm whether or not to delete all the shooting completion information ("Yes" or "No") is displayed (see FIG. 10).

At this time, when "Yes" is selected and then the MENU/OK switch SW12 is pressed, by the all deleting device, the shooting completion information is all deleted (all flags of the shooting completion information "1" are changed to "0") (step of all deleting).

Note that the operation performed by each device described above, that is, the operation performed by each of the reading device, the displaying device, the selecting device, the recording device, the deleting device, and the all deleting device is controlled by the CPU block 104-3 in accordance with a control program stored on the ROM 108.

As explained above, by using the digital camera according to the present embodiment, in a case where, for example, at a construction site and so on, a plurality of shooting scenes are predetermined, names of shooting scenes that have to be shot and so on are recorded on a camera memo file in advance, and at an actual construction site, by using the camera memo file, the names of the scenes and so on are displayed as a display of a camera memo on the digital camera, and a scene corresponding to the displayed display of the camera memo is shot, and when each of all the displays of camera memos is displayed with a display of "completed shooting", all shootings have been completed.

According to the embodiment of the present invention, it is possible to provide an imaging apparatus that is capable of preventing forgetting to shoot in a case of shooting a plurality of predetermined scenes, and an imaging method.

Although the present invention has been described in terms of exemplary embodiments, it is not limited thereto. It should be appreciated that variations may be made in the embodiments described by persons skilled in the art without departing from the scope of the present invention as defined by the following claims.

CROSS REFERENCE TO RELATED APPLICATION

The present application is based on claims priority from Japanese patent application number 2010-174416, filed Aug. 3, 2010, the disclosure of which is hereby incorporated by reference here in its entirety.

The invention claimed is:

1. An imaging apparatus comprising:
a reading device that reads a recording file on which a plurality of groups of information of character strings are stored in advance, each group of information of character strings including at least two character strings that each express a respective name of a classified item and at least two character strings that each express content from a respective group of character strings that corresponds to a respective classified item;
a displaying device that displays any one group of the plurality of groups of information of character strings read by the reading device;
a selecting device that selects one desired group of information of character strings from the plurality of groups of information of character strings; and
a recording device that records shooting completion information on the recording file independently of corresponding shot image data, the shooting completion information indicating shooting corresponding to the one desired group of the information of character strings has been completed when shooting is performed in a state where the one desired group of the information of character strings is selected by the selecting device,
wherein when one group of the plurality of groups of the information of character strings is selected by the selecting device and displayed by the displaying device, based on the shooting completion information recorded on the recording file, the displaying device displays the selected one group of the plurality of groups of the information of character strings, and a display of completed shooting that indicates an image corresponding to the selected one group of the plurality of groups of the information of character strings has been shot together.

2. The imaging apparatus according to claim 1 comprising:
a deleting device that deletes the shooting completion information corresponding to one group of the plurality of groups of information of character strings is selected and displayed by the selecting device and the displaying device.

3. The imaging apparatus according to claim 1 comprising:
an all deleting device that deletes all the shooting completion information corresponding to the plurality of groups of information of character strings.

4. The imaging apparatus according to claim 1, wherein the reading device reads the recording file from a removable storage device, and
wherein one group of the plurality of groups of the information of character strings corresponding to an image shot by another imaging apparatus in which the removable storage device was previously installed is selected by the selecting device, based on the shooting completion information recorded on the recording file, the displaying device displays the one group of the plurality of groups of the information of character strings corresponding to an image shot by another imaging apparatus in which the removable storage device was previously installed and a display of completed shooting.

5. An imaging method comprising:
a step of reading a recording file on which a plurality of groups of information of character strings are stored in advance, each group of information of character strings including at least two character strings that each express a respective name of a classified item and at least two character strings that each express content from a respective group of character strings that corresponds to a respective classified item;
a step of displaying any one group of the plurality of groups of information of character strings read in the step of reading;
a step of selecting one desired group of information of character strings from the plurality of groups of the information of character strings; and
a step of recording shooting completion information on the recording file independently of corresponding shot image data, the shooting completion information indicating shooting corresponding to the one desired group of information of character strings has been completed when shooting is performed in a state where the one desired group of the information of character string is selected in the step of selecting;
wherein when one group of the plurality of groups of the information of character strings is selected in the step of selecting, and displayed in the step of displaying, the step of displaying displays the selected one group of the plurality of groups of the information of character strings, and a display of completed shooting that indicates an image corresponding to the selected one group of the plurality of groups of the information of character strings has been shot together.

6. The imaging method according to claim 5 comprising:
a step of deleting the shooting completion information corresponding to one group of the plurality of groups of information of character strings is selected and displayed in the step of selecting and the step of displaying.

7. The imaging method according to claim 5 comprising:
a step of deleting all the shooting completion information corresponding to the plurality of groups of information of character strings.

8. The imaging method according to claim 5, wherein the step of reading the recording file comprises reading the recording file with a first imaging apparatus from a removable storage device previously installed in a second imaging apparatus,
- wherein the step of selecting comprises selecting one group of the plurality of groups of the information of character strings corresponding to an image shot by the second imaging apparatus, and
- wherein the step of displaying comprises displaying the one group of the plurality of groups of the information of character strings corresponding to an image shot by another imaging apparatus in which the removable storage device was previously installed and a display of completed shooting based on the shooting completion information recorded on the recording file.

* * * * *